Patented Oct. 28, 1930

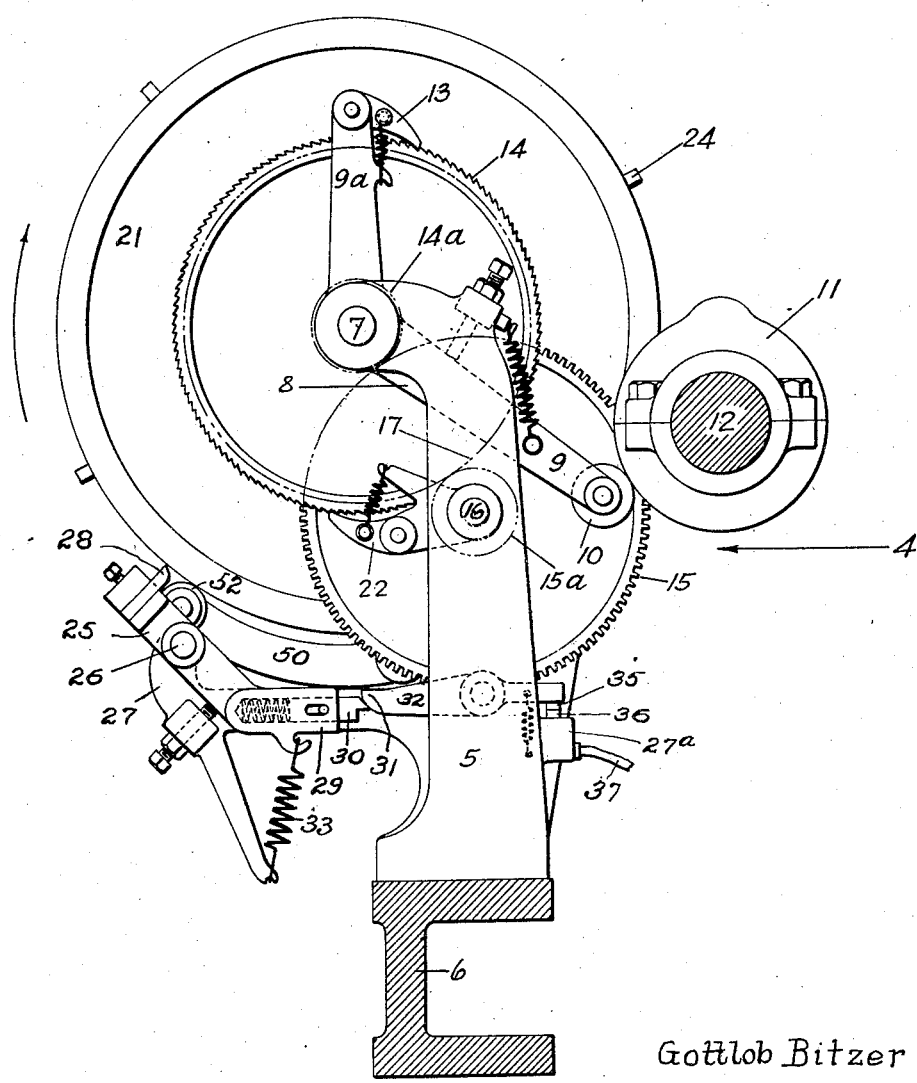

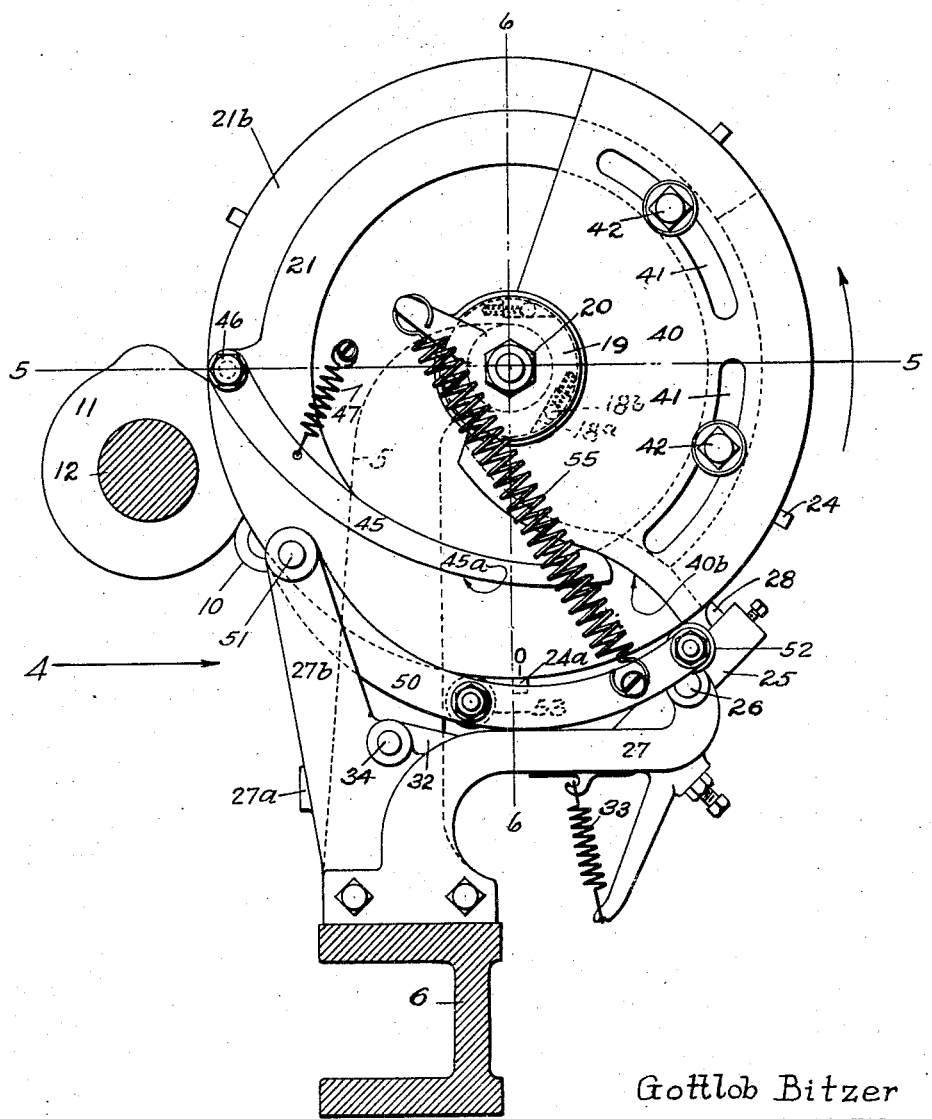

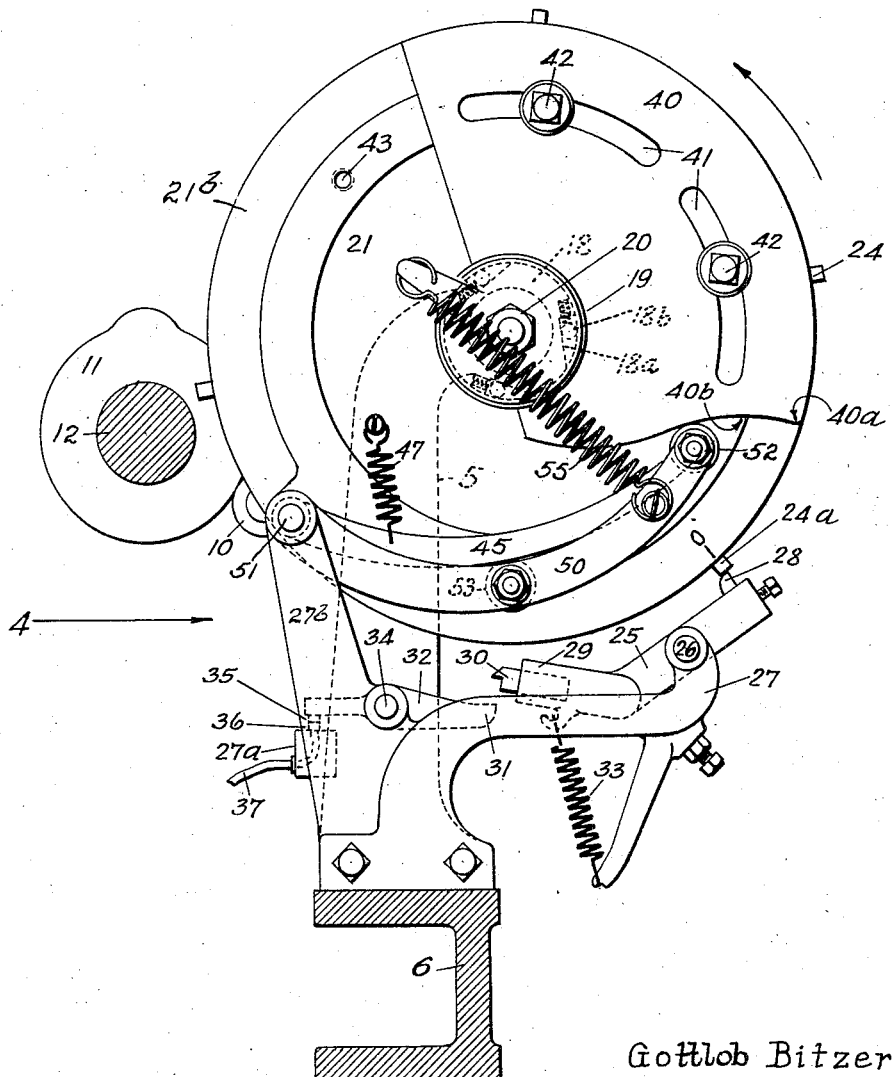

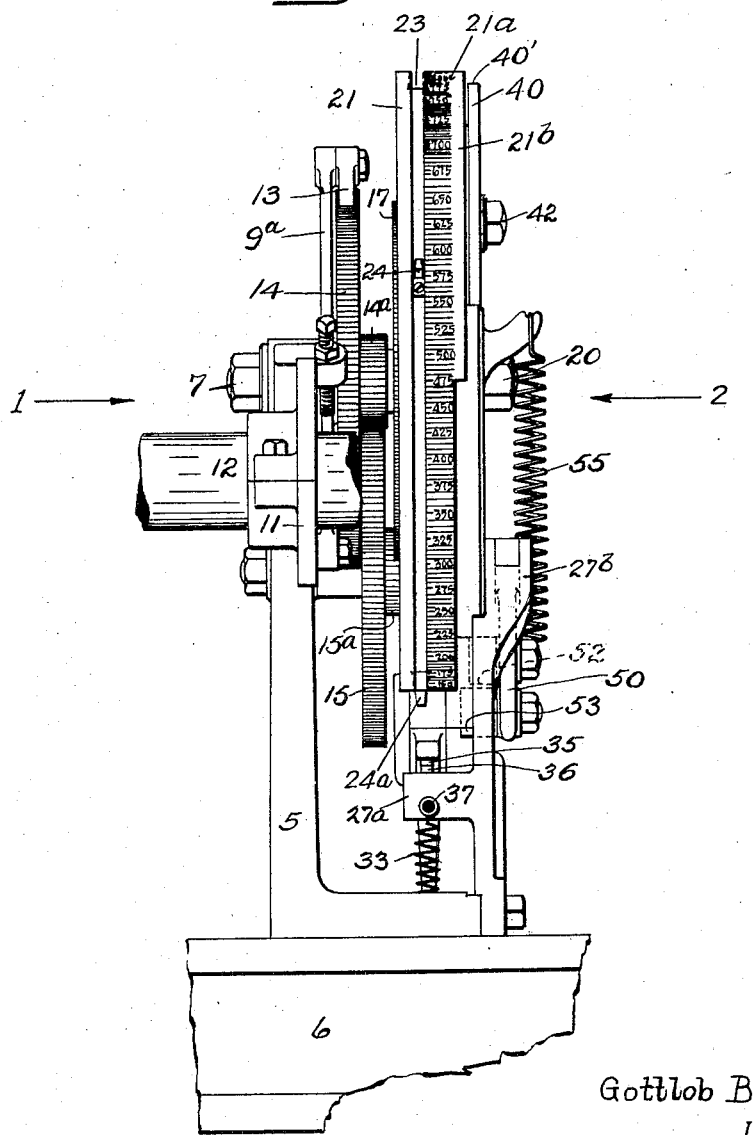

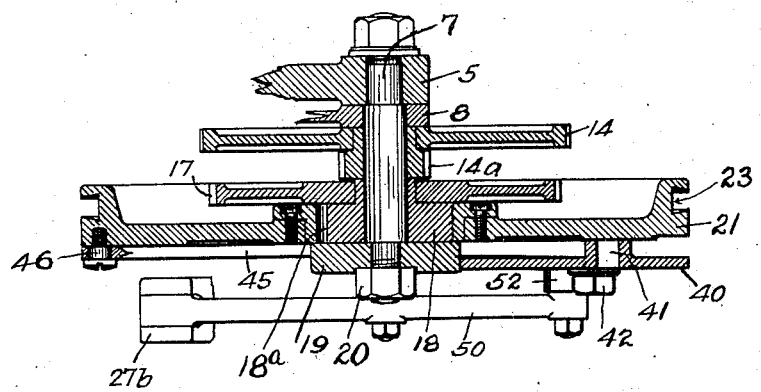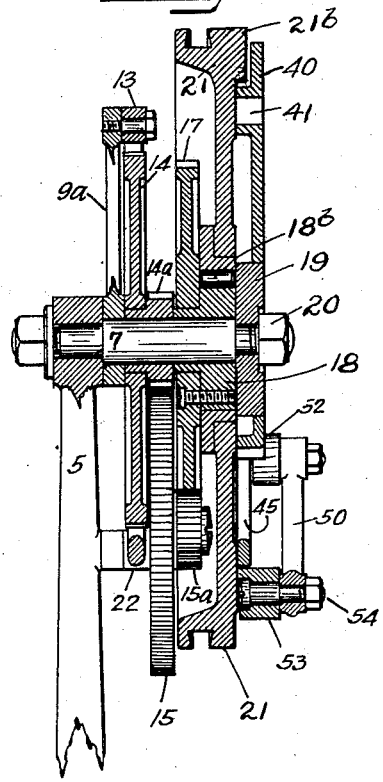

1,779,999

UNITED STATES PATENT OFFICE

GOTTLOB BITZER, OF WYOMISSING, PENNSYLVANIA, ASSIGNOR TO TEXTILE MACHINE WORKS, OF WYOMISSING, PENNSYLVANIA, A CORPORATION OF PENNSYLVANIA

AUTOMATIC STOP-CONTROL MECHANISM

Application filed October 10, 1927. Serial No. 225,219.

My invention relates to automatic stop control mechanism applicable to certain types of machines to control the operation of the latter at similar times in successive operations to insure accurate uniformity of output; and more specifically my invention comprises broadly a counter head measuredly rotated from the machine and carrying adjustably positioned stop-operating projections, my objects being to simplify the essential mechanism required for accurate machine control so as to reduce its first cost and subsequent upkeep, to facilitate its ready application to and operation from the machine to which it is applied, and to provide for its automatic re-setting of itself at the end of each cycle of control movement so as to be immediately in position for a succeeding cycle. And while my improved mechanism may be used for any machine requiring periodic similar controls in its successive operations, it is more particularly applicable to full fashioned knitting machines as a course counter for the latter so as to control the machine at determined courses and limit the length of the completed fabric by stopping the machine after the desired number of total courses have been knitted, and, irrespective of the length of the latter, automatically functioning to immediately position the control mechanism at starting position.

With the above objects outlined, and with others that will appear as the description progresses, my invention comprises the construction fully set forth in the following specification, in connection with the drawings accompanying the same and forming part thereof, in which like reference characters represent like parts, and the novel features which I desire to secure by Letters Patent are pointed out in the appended claims.

Fig. 1 is a side elevation of a preferred embodiment of my mechanism as applied to an ordinary full-fashioned stocking-knitting machine, showing its relation to the usual cam-shaft, indicated in cross-section, and to a longitudinal frame-member upon which it is mounted; the view being in the direction of arrow 1, Fig. 4.

Fig. 2 is a corresponding opposite-side elevation, looking in the direction of arrow 2, Fig. 4; the course-determining sector-plate being set to an intermediate position thereon and the disc being shown in nearly completed racked position for a determined length of fabric.

Fig. 3 is a view corresponding with Fig. 2, but showing the disc as supplementally moved by the advancing lever preliminary to the final movement of the counter disc to position for starting another fabric.

Fig. 4 is an edge view looking in the direction of arrow 4, Figs. 2 and 3, a small portion only of the cam shaft being indicated.

Fig. 5 is a sectional view on the line 5—5 of Fig. 2; and Fig. 6 is a sectional view mainly on the line 6—6 of Fig. 2 but with parts broken away to clearly show the relative arrangement of the resetting lever.

In order to insure uniformity of production of full-fashioned hosiery it is essential that the various machine operations and yarn changes producing the several courses be effected at the same respective course in each stocking produced; and to this end my invention relates to a counter-disc device operative step-by-step as each course is made, and carrying adjustably set fingers adapted to act at determined courses to control the knitting mechanism as required.

My invention comprises, in the specific construction shown in the drawings, a bracket 5, secured at a convenient location, to a longitudinal beam 6 of the machine, said bracket having a fixed axle or stud 7 mounted in its free end and extending outwardly therefrom. Upon said axle 7 a bell-crank 8 is freely rotatable with one end 9 thereof having a roller 10 adapted to ride on a cam 11 of the usual cam shaft 12 of the knitting machine, and its opposite end 9ª pivotally supporting a pawl 13 adapted to engage and rack the teeth of a wheel 14; said wheel being loosely carried on axle 7 adjacent bell crank 8, and having fixed thereto, or formed integrally therewith, an axially alined pinion gear 14ª adapted to mesh with a gear 15 pivotally mounted on a stud 16 on bracket 5. Said gear 15 is formed with an axially alined pinion gear 15ª which meshes with a second gear 17, coaxial with axle 7, but preferably, as shown, being fixed to a sleeve 18 retained on said axle by an end cap 19, and nut 20. Sleeve 18 also carries a rotatable counter disc 21, preferably, as shown, through a friction device, comprising as indicated inclined sleeve ways 18ª and spring backed rollers 18ᵇ, so that said disc will positively rotate with said sleeve when the latter is rotated by gear 17 but is capable of independent movement in the same direction. Unintentional movement of the latter may be prevented as by a braking device not shown in the drawings, or merely friction of cap 19, while dog-pawl 22 on bracket 5 may be used to prevent reverse movement of ratchet wheel 14. In the construction thus far described, the cam 11 operates at each cam shaft rotation through bell-crank 8 to rack gear 14 one tooth, and the latter through its pinion 14ª, gear 15, pinion 15ª, gear 17 and clutch connection on sleeve 18 rotates said disc 21 a determined distance,—the ratio, for instance, being 1 to 2,000, and the peripheral face of counter disc 21 in this case being divided and marked into scale divisions of 2,000 equal parts, as indicated at 21ª; each such division representing a course of knitting as for a stocking. The periphery of disc 21 is also grooved as shown at 23, in which may be lockingly engaged a series of stop operating projections 24, readily moved and set as desired according to the scale markings.

A trip lever 25, as shown, pivoted at 26 on a bracket arm 27 has an adjustable trip finger 28 normally riding on the periphery of counter disc 21, but raised by a passing projection 24 to tilt said lever 25 and cause its opposite end 29, provided with a retractable spring backed latch 30, to lift above the end 31 of a switch lever 32; a spring 33 acting, after passing of the projection 24 to lower said end 29, causing latch 30 to momentarily engage with and swing said switch lever end 31 on its pivot 34; said latched end 29—30 comes to rest in normal position beneath the end 31 of lever 32 as indicated in Fig. 1. The opposite end of lever 32, as shown, is formed with a stud member 35 normally resting upon a fixed stud member 36 on arm 27ª to close an electric circuit through wire 37, which circuit is broken by the swinging of lever 32 as above described; and such interruptions in the electric circuit may be used in any well known manner not shown, to throw an electric switch of a drive motor, or a belt shifting mechanism.

It will be readily understood that in the construction thus far described, the counter disc 21, with its stop-operating projections adjusted to the scale markings 21ª, when measuredly rotated from the cam shaft 12 as indicated, will operate the lever 25 in the manner set forth to break the contacts 35 and 36 at determined courses and thus control the machine stop motion. But such operation, in the case of a fabric having less than the maximum number of courses indicated by the scale on the disc periphery, will leave a gap of more or less extent between the last adjusted stop projection 24 and the starting position for the succeeding disc operation; and to accomplish my stated object of automatically resetting the disc to starting position, irrespective of the fabric length desired and with no loss of idle racking disc rotation, I employ a disc advancing lever 50, later herein described, which rides on a track way therefor and acts at a determined course to impart supplemental rotation to said disc so as to advance the stop-operating action of a projection 24ª, which in this case is fixedly positioned at the starting position for said disc.

The aforesaid track way for lever 50 is preferably formed, as clearly indicated in the drawings, first, by the periphery of a partial circumferential flange 21ᵇ on said disc; second, by the periphery and a radially inclined edge of a maximum course determining sector plate 40, having radial slots 41, 41, by which it may be adjustably secured to disc 21 as by bolts 42, 42 engaging in disc apertures 43; and third by the edge 45ª of a track connecting arm 45, pivoted to said disc at 46 adjacent an end of said flange 21ᵇ, and having its free end held in contact with said sector edge 40ᵇ as by a spring 47. The peripheral end 40ª of said sector plate 40 is set opposite the scale marking corresponding with the total number of courses desired, and such setting, it will be noted, determines the overlapping of the opposite end of said sector plate and the flange 21ᵇ, and also the position of contact of the free end of lever 45 with the sector edge 40ᵇ, both being variable according to the sector setting, and the peripheral edges of the latter forming a track in a plane spaced from the track formed on the periphery of disc flange 21ᵇ, with arm track 45ª connecting them.

The advancing lever 50 before mentioned, is preferably formed, as shown, as a curved arm with one end pivotally mounted at 51 on a bracket extension 27ᵇ, with its free end carrying an anti-friction roller 52 projecting laterally therefrom, and a second laterally projecting, but wider faced roller 53 intermediately supported thereon. A spring 55 acts on said lever 50 to cause its rollers to follow the aforesaid track way, roller 52 being of such width as to engage only the peripheral track way edges 40′ and 40ᵇ of sector plate 40, while wider roller 53 engages the peripheral track of disc flange 21ᵇ and track way 45ª of track connecting arm 45.

The action of advancing lever 50 is as follows: As the disc 21 is racked in the direction indicated by the arrow, the roller 52 which has been riding on the peripheral edge of disc flange 21ᵇ, and then the periphery of sector plate 40 comes to the end 40ᵃ of the latter, when, under the tension of lever spring 55, it will act against the edge 40ᵇ of said sector plate to turn the disc 21 supplementally to its racked movement. While the roller 52 is riding on the edge 40ᵇ of the sector plate, intermediate roller 53 contacts with track edge 45ᵃ, of connecting arm 45, so that further rotation of disc 21, under action of lever 50 and spring 55, will cease, as roller 53 will press upon arm 45 so as to exert a neutralizing clock-wise turning action upon the disc, to which the arm is pivotally connected at 46. This action of advancing lever 50 thus supplementally turns the disc 21 when the racked movement thereof has brought the end 40ᵃ of sector plate 40 to roller 52, and as said sector plate was set at the final course desired, such supplemental turning of disc 21 may be used to advance the disc from the last used stop operating projection to its starting position. However, I prefer, as shown, to use a fixed projection 24ᵃ to actually complete the final stopping, by breaking contacts 34 and 35, as before described; such projection being located adjacent the zero mark of the scale, and such supplemental disc rotating action by advancing lever 50, advancing projection 24ᵃ close to blade 28, but requiring additional racked rotation of said disc 21 for a determined number of courses before said projection passes beneath said blade 28, the scale on disc 21 being so marked that any indication thereon will allow for such slight additional racked movement of disc 21, and the fixed projection 24ᵃ will trip the lever 25 to stop the machine after the completion by the machine of the exact number of knitted courses desired which correspond with the setting of the end 40ᵃ of sector plate to the scale indication. Such setting of the sector plate 40 determines the extent of the supplemental disc rotation required, but the action of lever 50 under tension of its spring 55 is such that this supplemental disc rotation will act between the racked rotation of disc 21, even for the maximum extent of a very short fabric, so that the measured rotation of said disc is not interrupted and acts positively after determined racking of gear 14 the desired number of teeth which may be conveniently set by the proper location of sector plate end 40ᵃ opposite the corresponding scale indication.

By means of such automatic advancing of the final fixed stop operating projection 24ᵃ through supplemental rotation of disc 21, the latter will always complete a full rotation back to starting position, though gear 14, which measures the successive courses, only rotates partially, the teeth on the latter continuing to measure accurately each course knitted on the machine irrespective at which notch it resumes its count for a succeeding operation.

From the starting position indicated in Fig. 3, which is also the final stopping position, the resumed racking of gear 14, will rotate disc 21 notch by notch, and cause roller 53 to ride on track connection 45ᵃ so as to lift roller 52 away from the sector track edge 40ᵇ, continued disc rotation causing roller 53 to ride onto the peripheral track of disc flange 21ᵇ and then onto sector plate periphery as before described, the roller 52 only taking action on the latter as heretofore set forth.

From the foregoing description it is thought the nature of my invention and its method of operation will be clearly understood, and I do not desire to limit myself to the specific embodiment shown and described, as modifications may be readily devised that are within the scope of my invention as defined in the following claims.

What I claim is:

1. An automatic stop control mechanism comprising a counter disc having a stop-operating projection and a sector plate adjustably fixed thereto, means for measuredly rotating said disc, and independent means operative upon said sector plate for imparting supplemental rotation to said disc so as to determinedly advance the stop-operating action of said projection.

2. An automatic stop control mechanism comprising a counter disc having a stop-operating projection and a sector plate adjustably fixed thereto, means for measuredly rotating said disc, and a spring-controlled lever operative on said sector plate to impart supplemental rotation to said disc to determinedly advance the stop-operating action of said projection by the measured rotation of said disc.

3. In combination with a cam shaft and a stop mechanism comprising a switch-operating trip finger, an automatic stop control mechanism comprising a rotary counter disc having a stop operating projection adapted to directly actuate said trip finger, means operative from said shaft for measuredly rotating said disc, and automatically controlled spring-operated means for imparting supplemental rotation to said disc so as to determinedly advance the stop-operating action of said projection.

4. In combination with a cam shaft and a stop mechanism, an automatic stop control mechanism comprising a rotary counter disc having a stop-operating projection and a sector plate adjustably fixed thereto, means operative from said shaft for measuredly rotating said disc, and a spring-controlled lever operative on said sector plate to impart supplemental rotation to said disc to determinedly advance the stop-operating action of said projection.

5. In an automatic stop control mechanism substantially as described, a disc having a partial track periphery, an adjustable sectoral extension thereof, and a movable track member connecting one end of said track periphery and a radial edge of said sectoral extension.

6. In the construction set forth in claim 5, an operative lever acting on the radial extension of said sectoral edge to supplementally rotate said disc.

7. In an automatic stop control mechanism substantially as described, a rotated head having a track periphery widened for a portion of its length, a sector member adjustably fixed to said disc to form a variable peripheral extension for one end of said widened track rim, and a movable arm on said head forming a track connecting the opposite end of said widened track and a radial edge of said sector member.

8. In the construction set forth in claim 7, a spring-pressed lever having an end roller adapted to ride on said sector member edges only, and an intermediate wider roller adapted to ride also on said widened track periphery.

9. In combination with a knitting machine having a cam shaft and a stop mechanism comprising a switch-operating trip finger, a course counter stop control mechanism comprising a counter head having a stop-operating projection adapted to directly actuate said trip-finger, and an adjustably fixed maximum course determining member, means operative from said cam shaft for measuredly rotating said head, and independent means operative on said maximum course determining member to impart supplemental rotation to said head to determinedly advance said projection.

10. In combination with a knitting machine having a cam shaft and a stop mechanism, a course counter stop control mechanism comprising a counter disc having a stop-operating projection, and a maximum course determining sector plate adjustably fixed to said disc, means operative from said shaft for measuredly rotating said counter disc, and a lever operative on said sector plate to impart supplemental rotation to said head to determinedly advance said projection.

11. In combination with a knitting machine having a cam shaft and a stop mechanism, a course counter stop control mechanism comprising a counter disc having a stop-operating projection and a peripheral track portion, a maximum course determining sector plate adjustably fixed to said disc to form a peripheral track extension, means to measuredly rotate said disc, and a lever idly ridable on said track and operative beyond the latter to impart supplemental rotation to said disc to determinedly advance said projection.

12. In combination with a knitting machine having a cam shaft and a stop mechanism, a course counter stop control mechanism comprising a measuredly rotated counter disc having a stop-operating projection and a peripheral track portion, a maximum course determining sector plate adjustably fixed to said disc to form a variable peripheral and a radial edge track extension, a movable arm forming a track connecting said radial edge portion and the opposite end of said peripheral disc track, and a spring pressed lever having an intermediate bearing riding on all said track portions and an end bearing riding only on said sector track portions to impart supplemental rotation to said disc so as to determinedly advance the stop-operating action of said projection.

13. In combination with a knitting machine having a cam shaft and a stop mechanism, a course counter stop control mechanism comprising; a counter disc measuredly rotated from said shaft and having a stop-operating projection and a peripheral track portion; a maximum course determining sector plate and a track connecting member jointly carried by said disc; and a supplemental disc rotating lever adapted to normally ride on the periphery of said sector plate and to operatively engage a radially extending edge thereof as limited by said track connecting member; said sector plate being rotatively adjustable on said disc to form a peripheral track extension, and said track connecting member being pivoted to said disc and having its free end retained in contact with said radial sector edge, and said supplemental disc rotating lever having a stopping contact with said pivoted track connecting member and ridable upon the latter to reposition said lever to ride upon said sector periphery.

14. An automatic stop control mechanism comprising a disc having a stop-operating projection, means for measuredly rotating said disc, and means comprising a disc-advancing lever and a disc-carried track therefor for independently imparting supplemental rotation to the disc to determinedly advance said projection.

15. An automatic stop control mechanism comprising a counter disc having a stop-operating projection, means for measuredly rotating said disc, an adjustably fixed lever-track on said disc and a disc-advancing lever riding on said track for independently imparting supplemental rotation to said disc.

16. An automatic stop control mechanism comprising a counter disc having a stop-operating projection, means for measuredly rotating said disc, an adjustably fixed lever contact on said disc and a disc-advancing lever adapted to independently impart supplemental rotation to the disc as controlled by the measured rotation thereof.

17. An automatic stop control mechanism comprising a counter disc having a stop-operating projection and a sector plate adjustably fixed thereto, means for measuredly rotating said disc, and independent means operative upon said sector plate to automatically impart a determined supplemental rotation to said disc and projection as controlled by the measured rotation thereof.

18. In combination with a rotary shaft, a stop mechanism comprising a switch-operating trip finger, a counter disc on said shaft having stop projections operative upon said trip finger, means to measuredly rotate said disc, automatically controlled spring-operated means for independently imparting supplemental rapid rotation to said disc for desired locating of a stop projection thereon, and means for imparting a final measured rotation to said disc to effect the stopping action of said projection on said trip finger.

In testimony whereof I affix my signature.

GOTTLOB BITZER.